Aug. 27, 1940.　　　W. C. HARPER　　　2,213,137
LIFTING TOOL
Filed March 26, 1940
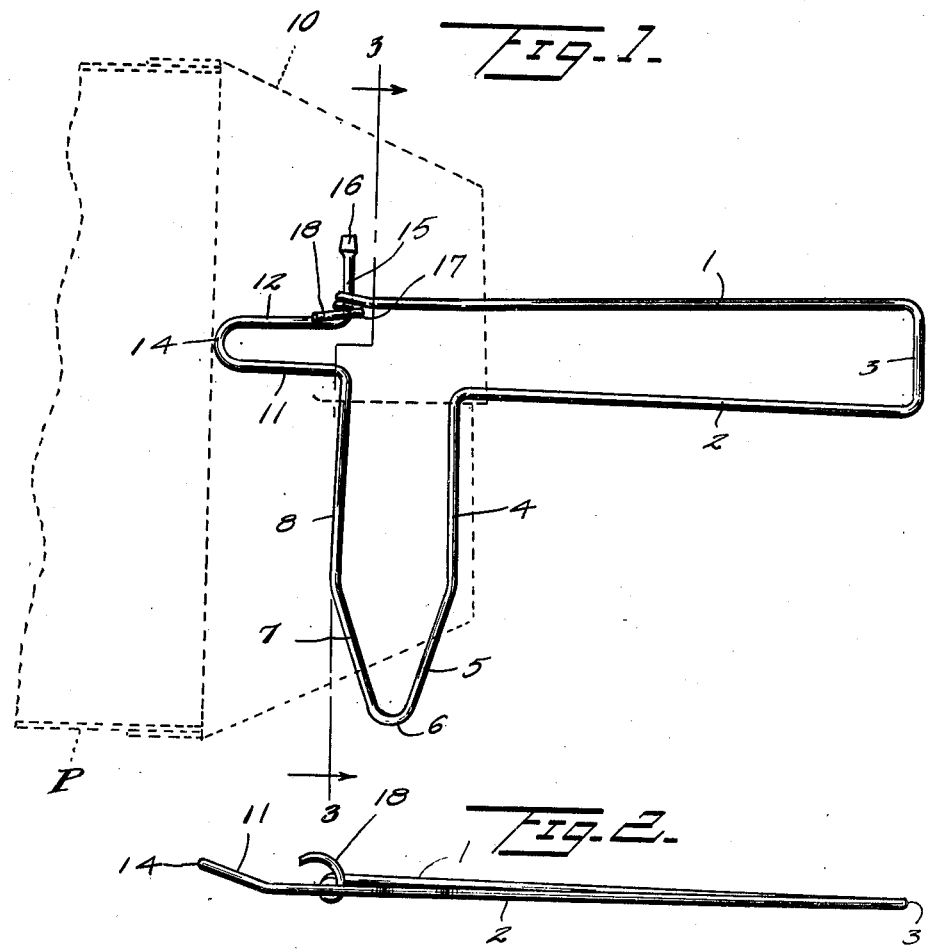
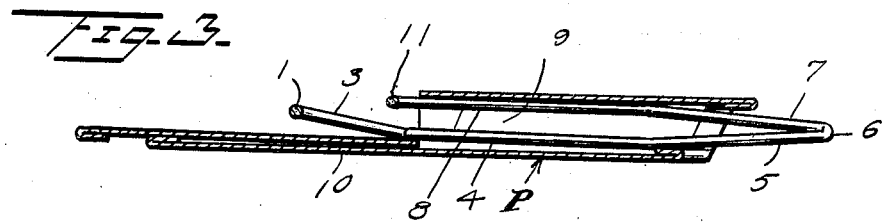
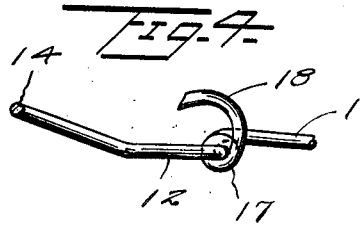
Inventor
W. C. Harper
By Watson E. Coleman
Attorney Patented Aug. 27, 1940

2,213,137

UNITED STATES PATENT OFFICE 2,213,137

LIFTING TOOL

William C. Harper, Brookneal, Va.

Application March 26, 1940, Serial No. 326,108

2 Claims. (Cl. 294—27)

This invention relates to a lifting tool, and it is a particular object of the invention to provide a tool of this kind especially designed and adapted for use in connection with a baking pan such as comprised in my application for patent executed on even date herewith.

It is also an object of the invention to provide a device of this kind constructed in a manner whereby it is capable of being employed to advantage for several different purposes.

The invention consists in the details of construction and in the combination and arrangement of the several parts of my improved lifting tool whereby certain important advantages are attained and the article rendered simpler, less expensive and otherwise more convenient and advantageous for use, as will be hereinafter more fully set forth.

The novel features of my invention will hereinafter be definitely claimed.

In order that my invention may be the better understood, I will now proceed to describe the same with reference to the accompanying drawing, wherein:

Figure 1 is a view in plan of a lifting tool constructed in accordance with an embodiment of my invention and shown applied to a baking pan, said pan being diagrammatically indicated in fragment by broken lines;

Figure 2 is a view in side elevation of the device as herein disclosed;

Figure 3 is a sectional view taken substantially on the line 3—3 of Figure 1, the associated pan being shown in full lines;

Figure 4 is an enlarged fragmentary view in side elevation of the portion of the device which is particularly capable of use as a bottle cap remover.

In the embodiment of my invention as illustrated in the accompanying drawing, the improved tool is made from a single strand of wire of requisite gauge and comprises the parallel members 1 and 2 connected at their outer ends by the cross member 3. The member 2 is of a length less than the length of the member 1 but said members 1 and 2 together with the connecting member 3 coact to provide a handle. The outer end of the member 2 of the handle is continued by the outwardly and perpendicularly related arm 4 in substantially the same plane as that of the members 1 and 2. This arm 4 at its outer end is continued by an inwardly inclined extension 5 terminating in a laterally disposed curved connecting member 6 continued by a second inclined member 7 converging toward the outer end of the extension 5. This member 7 is continued by an arm 8 substantially in parallelism with the arm 5 and in substantially the same plane. The arms 4 and 8 are spaced apart a distance so that said arms 4 and 8 together with the connected members 5 and 7 constitute an elongated arm to be inserted within a socket 9 disposed transversely of an extension or apron 10 carried by the end portion of a baking pan P. This pan P is of a type particularly described and illustrated in an application for patent executed on even date herewith.

The arm 8 terminates a distance slightly inwardly of the member 2 and is continued by an outwardly and substantially perpendicularly related arm 11. This arm 11 is substantially in parallelism with a second arm 12 and suitably spaced therefrom. The outer end portions of the arms 11 and 12 are connected by the outwardly curved cross member 14. The arms 11 and 12 with the connecting member 14 constitute a lug which, in the use as illustrated in Figure 1 of the drawings, materially facilitates the lifting operation although this lug if desired can be engaged within the conventional socket of a stove lid or the like for handling such a lid.

The inner end of the arm 12 is continued by an outwardly disposed elongated shank 15 substantially in alignment with the arm 8 and the outer end portion of this shank 15 is flattened, as at 16, to provide a blade for use as a screw driver.

The inner end of the member 1 of the handle is coiled, as at 17, around the inner portion of the shank 15 and terminates in an outwardly disposed arcuate prong 18. This prong 18 in coaction with the lug as afforded by the arms 11 and 12 and connecting member 14 permit the device to be employed with facility in the removal of bottle caps.

From the foregoing description it is thought to be obvious that a lifting tool constructed in accordance with my invention is particularly well adapted for use by reason of the convenience and facility with which it may be assembled and operated, and it will also be obvious that my invention is susceptible of some change and modification without departing from the principles and spirit thereof and for this reason I do not wish to be understood as limiting myself to the precise arrangement and formation of the several parts herein shown in carrying out my invention in practice except as hereinafter claimed.

I claim:

1. As a new article of manufacture, a lifting tool comprising an elongated handle member, and a laterally disposed elongated engaging element carried by the handle member adjacent to an end thereof, the handle member and the engaging element constituting a single strand of wire with the extremities of the strand connected adjacent to the end portion of the handle member provided with the engaging element, said connection including an outwardly disposed arcuate part for coaction with a portion of the handle member extending beyond the engaging element.

2. As a new article of manufacture, a lifting tool comprising an elongated handle member, and a laterally disposed elongated engaging element carried by the handle member adjacent to an end thereof, the handle member and the engaging element constituting a single strand of wire, one end portion of such strand being extended laterally to provide a shank, the opposite end portion of the strand being wrapped around said shank.

WILLIAM C. HARPER.